FIG. 3 — EFFECT OF SiO$_2$ CONCENTRATION ON THE PROPERTIES OF SILICA GELS

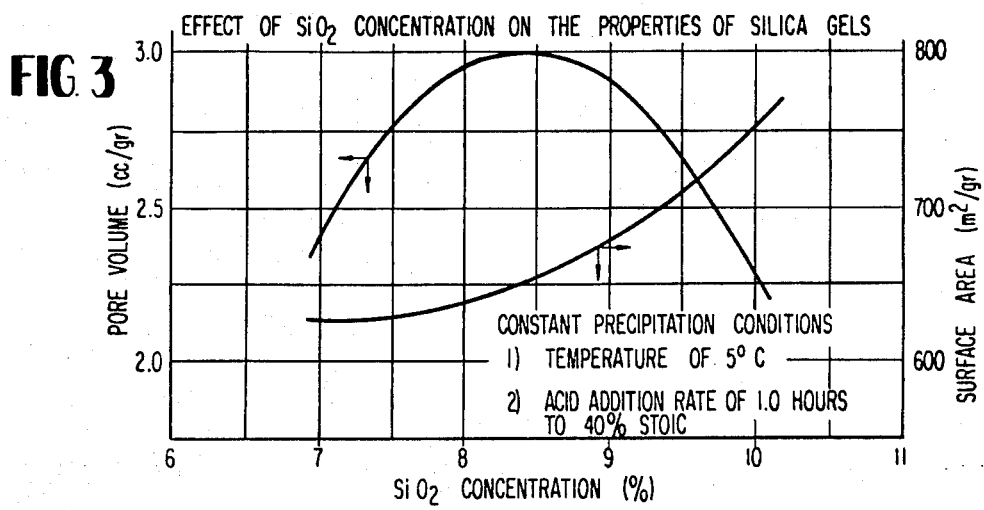

CONSTANT PRECIPITATION CONDITIONS
1) TEMPERATURE OF 5° C
2) ACID ADDITION RATE OF 1.0 HOURS TO 40% STOIC

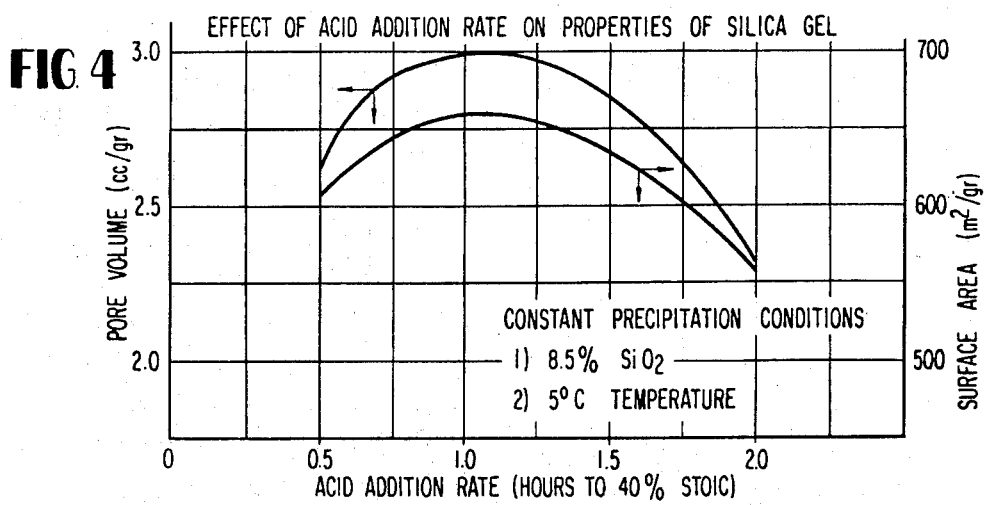

FIG. 4 — EFFECT OF ACID ADDITION RATE ON PROPERTIES OF SILICA GEL

CONSTANT PRECIPITATION CONDITIONS
1) 8.5% SiO$_2$
2) 5°C TEMPERATURE

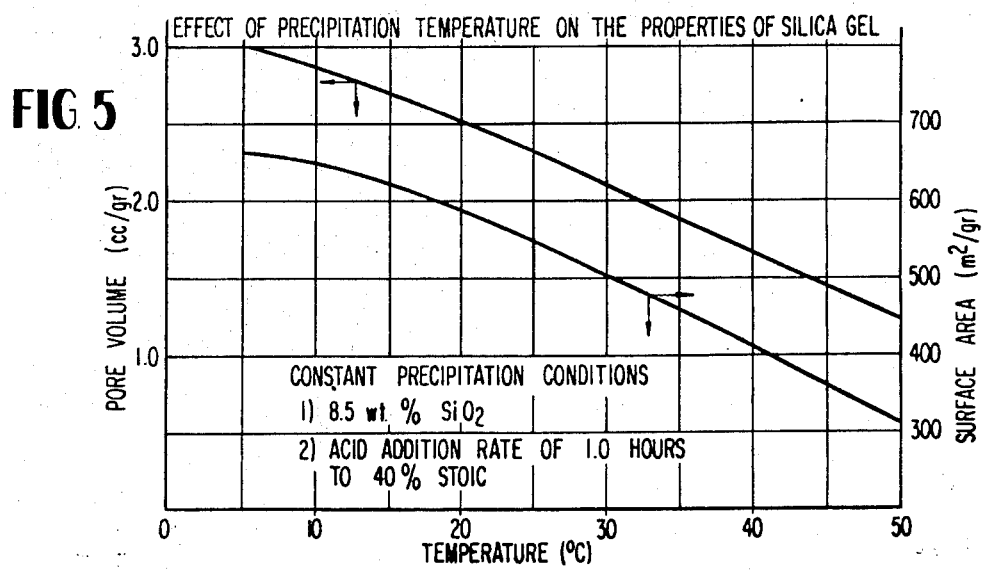

FIG. 5 — EFFECT OF PRECIPITATION TEMPERATURE ON THE PROPERTIES OF SILICA GEL

CONSTANT PRECIPITATION CONDITIONS
1) 8.5 wt % SiO$_2$
2) ACID ADDITION RATE OF 1.0 HOURS TO 40% STOIC

United States Patent Office 3,801,705
Patented Apr. 2, 1974

3,801,705
PREPARATION OF SILICA GELS
Jerome H. Krekeler, Cincinnati, Ohio, William Kirch, Clinton, Iowa, and Henri A. Aboutboul, Brussels, Belgium, assignors to National Petro Chemicals Corporation, New York, N.Y.
Continuation-in-part of application Ser. No. 766,693, Oct. 11, 1968, now Patent No. 3,652,216. This application Oct. 26, 1971, Ser. No. 192,134
The portion of the term of the patent subsequent to Mar. 28, 1989, has been disclaimed
Int. Cl. C01b 33/12, 33/16
U.S. Cl. 423—338                                    28 Claims

ABSTRACT OF THE DISCLOSURE

Silica xerogels having a narrow pore diameter distribution in the range of 300–600 A., and surface areas in the range of from 200–500 m.$^2$/g., pore volumes in the range of 2.0–3.5 cm.$^3$/g. and the process of preparing such xerogels comprising critically controlled steps of precipitation of the silica gel, aging the precipitated silica hydrogel slurry, controlling the level of alkaline material in the precipitated hydrogel slurry by washing the aged product and drying the gel by azeotropic distillation with a solvent which is non-miscible with water. Also, a process for preparing such xerogels wherein the non-water miscible solvent is continuously recycled so that a minimum amount of solvent need be used.

---

This application is a continuation-in-part of U.S. application Ser. No. 766,693 filed Oct. 11, 1968, and now U.S. Pat. No. 3,652,216.

BACKGROUND OF THE INVENTION

Field of the invention

This invention relates to silica xerogels having a narrow pore diameter distribution in the pore diameter range of 300–600 A., surface areas ranging from 200–500 m.$^2$/g., pore volumes of from about 2.0 to 3.5 cm.$^3$/g. and to a process for preparing such silica xerogels.

Description of the prior art

Much of the technology in the area of silica gels involves the problem of making strong hard gel masses which will not shrink and crack upon being dried. The gels are useful as absorbents and catalyst bases. Gels of small particle size and narrow particle size distribution, about 50 microns mean diameter, have been found to be the most desirable for fluid bed or stirred reactor catalyst operations because they are more easily fluidized, reduce the amount of corrosion of equipment and suffer less degradation by abrasion and particle rupture.

The only such silica gels thus far reported having a suitable particle size and narrow pore size distribution for the purpose mentioned above are those described in co-pending applications Ser. Nos. 750,733 and 750,734, both filed Aug. 6, 1968.

In application Ser. No. 750,734,[1] there was disclosed a process for preparing silica xerogels with narrow pore diameter distribution in the range of 300 to 600 A. and a surface area in the range from 200 to 500 m.$^2$/g. which included the step of displacing water before drying the gel so as to reduce the surface tension and other interfacial forces involved in the dehydration process. Such a process is cumbersome because the hydrophilic nature of the silica gel requires a somewhat long equilibrium time to displace the water. Water is normally strongly absorbed on silica gel due to hydrogen bonding with the silanol groups which cover the surface of the gel.

In application Ser. No. 750,733,[1] there was disclosed a process for preparing silica gels with narrow pore diameter distribution in the range of 300 to 600 A. and surface area in the range from 200 to 500 m.$^2$/g., including the step of drying the silica gel directly from water by freezing and drying the gel under vacuum while the water in the pores is maintained in the frozen state so as to eliminate the effects of the surface tension. However, such a process requires expensive equipment to provide the very low temperatures (down to −160° C.) and very high vacuum needed. Another basic problem in a commercial process using freeze drying is that there is a tremendous amount of dusting and material carry over, while subliming the ice.

It has now been found that by using certain controlled steps during precipitation, heat aging, controlling the alkaline material content in the hydrogel and by drying the silica hydrogel by azeotropic distillation with a non-water miscible solvent under certain predetermined conditions, a product equivalent to that obtainable in our copending applications Ser. Nos. 750,733 and 750,734 can be obtained without a corresponding shrinkage of the silica gel. Furthermore, it has been found that this process can be caried out with a limited amount of solvent by decanting the water from the spent solvent and repeatedly reusing the solvent. This procedure precludes any need for rectification or further purification of the solvent.

SUMMARY OF THE INVENTION

The present invention provides silica xerogels having a narrow pore diameter distribution primarily in the range of from 300–600 A., surface areas ranging from 200–500 m.$^2$/g., pore volumes of from 2.0 to about 3.5 cm.$^3$/g., and stability at temperatures of up to about 2,000° F. in a fluidized bed. The invention further contemplates a process for preparing the foregoing silica xerogels which comprises the following steps:

1. Precipitation of a silica gel by reaction of a water soluble silicate to precipitate the silica therefrom, e.g., by neutralization of an aqueous alkaline silicate solution, most preferably, $xNa_2OySiO_2$, with a strong acid, a weak acid such as $CO_2$, ion exchange resins or by any other suitable neutralization procedure, carried out in about stoichiometric proportions under good agitation, e.g., high shear agitation. The primary criterion which any silica source must exhibit to be useful in the present process is that it must permit the silica to be introduced into the aqueous system in the form of a water soluble silicate which can yield very small dense particles of silica which gel of precipitate to yield the hydrogel. For instance, a water soluble alkaline silicate such as a sodium silicate can be neutralized by a controlled acid addition, e.g., with sulfuric acid to yield very small dense particles of silica which in turn gel to give the hydrogel. The acid neutralization will also yield an acid-base salt, for instance sodium sulfate from the neutralization of a sodium silicate with sulfuric acid. A part of such a salt becomes entrapped in the hydrogel during precipitation and must be washed therefrom as described in Step 3.

For commercial use, water soluble silicates are commonly available as alkaline silicates, including the sodium silicates, the potassium silicates, the crystalline quaternary ammonium silicates, the lithium silicates, etc. The sodium silicates are preferred as they are inexpensive and readily available at varying silicate contents, depending upon the producer. The following discussion will be in terms of the precipitation of the hydrogel from an aqueous alkaline silicate solution. The water soluble silicate selected must be such that precipitation is in accordance with the fol- ---
[1] Both continued-in-part as applications S.N. 191,978 and 191,977, filed Oct. 26, 1971 and Oct. 26, 1971, respectively.

lowing conditions to provide a silica xerogel of the necessary parameters which is especially suited for use as a catalyst for olefin polymerization:

(a) The SiO$_2$ concentration in the final slurry is between 5 and 12 percent by weight and preferably from about 8 to about 9 percent. Outside of this range, the gel cannot be preserved.

(b) The neutralization medium is added at a rate such that the gel point is reached in from about 30 minutes to about 120 minutes, and preferably about 60 minutes, whereafter the remaining amount of the neutralization medium required to provide a pH as called for in Step 1(d) is added. Usually up to about 40 percent of the required amount of the neutralization medium is added in from about 30 to about 120 minutes, whereafter the remaining about 60 percent or more of the neutralization medium is added. Since the neutralization is exothermic, the post-gel point addition of the balance of the neutralization medium should not be at a rate which causes the temperature to rise outside of the range specified in Step 1(c). The post-gel point rate of neutralization medium addition should also not be so rapid as to cause large localized areas where the pH drops below the lower limit of the range specified in Step 1(d). Typically, at least 20 minutes serve as a practical minimum time for post-gel point neutralization medium addition. Long addition periods can be used but are unnecessary so long as the above temperature/pH criteria are met. Preferably, the post-gel point addition of the neutralization medium is accomplished in from about 20 to about 90 minutes more, and preferably about 45 minutes more.

(c) The temperature during precipitation is maintained between about 0 to about 17° C., preferably 0 to about 10° C. and most preferably at about 5° C., and (d) The pH during precipitation is from 3 to 8 and preferably between about 5 to about 7.

2. Aging the precipitated silica hydrogel slurry under the following conditions:

(a) At a pH of from 3 to 8, preferably between about 4 and about 7, and preferably at a temperature between about 50° C. and about 100° C., most preferably between about 90° C., and about 95° C.

(b) For a period of time sufficient to strengthen the fragile gel structure, preferably from about 1 to about 6 hours and more preferably from about 2 to about 4 hours.

The aging of Step 2 is necessary to strengthen the fragile gel, which will otherwise be destroyed during subsequent processing. It is critical during aging that:

(1) the pH range be maintained in the range of 3 to 8; and
(2) the pH, temperature and time be correlated in a very specific manner.

Amplifying upon the need for strict pH control, as the pH of the hydrogel slurry approaches 3, the qualities of the final gel begin to deteriorate and it is impossible to obtain a final gel of the desired properties. Thus, aging at a pH lower than the pH 3–4 range is prohibited. On the other hand, as the pH becomes too alkaline, the properties of the final gel also suffer. The upper pH limits can only be defined with an operating temperature. At the higher acceptable temperature levels, i.e., the 90° C.+ range (considered most desirable since low temperatures significantly increase the required time), as the pH approaches 8, the properties of the final gel also suffer, and aging at a pH greater than the pH 7–8 range is prohibited. If the temperature of heat aging is decreased, the allowable pH of aging may be increased over the values stated.

With respect to the correlation of the pH, temperature and time, the following relationships have been established, If the pH is lowered at constant temperature, the time of aging must be increased. If the pH is lowered at constant aging time, the temperature must be increased. Obviously, both time and temperature can be increased to obtain the same effect. The reverse is true for aging at higher pH's.

If pH is constant, lowering the temperature of aging requires longer aging times to be used and raising the temperature of aging requires shorter aging time to be used.

Considering the above factors, pH is usually the parameter held constant during the aging as variation from the described range destroys the gel. Operation will generally be in the pH 5 to 7 range to allow a safety factor between the pH limits of 3 and 8.

With the pH in the 5 to 7 range, the temperature is almost always maintained above 50° C., and thus the preferred agings may be considered heat accelerated agings. While aging will proceed at much lower temperatures, at a pH of just above 3 and a temperature in the area of 17° C. aging will take weeks, which is commercially unacceptable. While the maximum aging time and the minimum aging temperature are thus not overly critical per se, they must be appreciably correlated with pH.

3. Reducing the alkaline material concentration of the hydrogel by washing the hydrogel with a liquid which is capable of displacing the acid-base salt entrapped in the hydrogel during precipitation until the resulting wash liquor at equilibrium contains less than about 20 p.p.m. (weight parts) of the alkaline material expressed as the acid-base salt. For the neutralization of a sodium silicate with sulfuric acid, less than 20 p.p.m. sodium expressed as sodium sulfate, when the sodium in the product is in equilibrium with the wash liquor at room temperature, i.e., less than about 1,500 p.p.m. (weight parts) sodium expressed as sodium sulfate in the dried gel. The product is then preferably washed with water if water is not the displacing liquid. For certain end uses, e.g., where the dry gel is to be calcined at high temperature, say 1,800° F., for activation as a catalyst base, it is preferred to wash to less than 1,000, more preferably 600 p.p.m. (weight parts) of the alkaline material in the dried gel. Generally, the higher the calcination temperature the lower the amount of alkaline material permitted in the final gel. Preferred washing liquids are solutions of salts such as aluminum chloride or sulfate and ammonium chloride or nitrate. The displacing can also be accomplished by washing with an acid such as hydrochloric, sulfuric, or nitric acid or with water, though washing only with water is more time consuming. Dilute solutions of these acids must be used so the lower pH limit of 3 referred to previously not be exceeded, i.e., the pH does not fall below 3.

In those instances where the water soluble alkaline silicate has been neutralized with an ion exchange resin, it will, of course, be necessary to separate the hydrogel from the then alkaline form of the ion exchange resin.

4. Adding a nonwater miscible solvent which forms an azeotrope with water when distilled and distilling the azeotrope so as to remove substantially all the water under specific conditions.

5. Drying the gel from the solvent, by distilling the excess solvent.

The above procedures (Steps 1 to 5) provides a silica gel in accordance with the described parameters. However, many users will desire a silica gel of a particular particle size, e.g., one adapted to serve as a catalyst support for use in fluidized beds. Accordingly, one may wish to comminute or homogenize and reduce gel particle size by high shear mixing. This optional step may be done by high shear mixing the product from Step 3 to obtain particles having a desired mean diameter, for instance, a mean diameter of less than about 200 microns, preferably in the range of from 30 to 150 microns. If, however, good agitation is used during precipitation, e.g., high shear agitation, and careful pH, temperature and time control is maintained on the intermediate product during aging, usually but not necessarily combined with agitation during aging, a separate comminuting step can be omitted as the particles will have a mean diameter of less than about 200 microns.

A comminution or homogenization may be necessary in some instances where agitation is not carried out during the aging of Step 2 and process conditions are not critically observed. In such a case, the required comminution may be carried out either prior to alkaline moiety displacement, intermediate alkaline moiety displacement and washing with water miscible organic liquid or after both alkaline moiety displacement and washing with the water miscible organic liquid. It is preferred to comminute at a point no later than alkaline moiety displacement as small particles are much easier to wash.

BRIEF DESCRIPTION OF THE DRAWINGS

FIG. 3 shows the effect of the final $SiO_2$ concentration in the slurry upon the surface area and pore volume of the product silica xerogel immediately after precipitation (see Example V);

FIG. 4 shows the effect of the rate at which the neutralizing medium is added to the aqueous sodium silicate solution upon the surface area and pore volume of the product silica xerogel immediately after precipitation (see Example VI); and FIG. 5 shows the effect of varying the temperature of precipitation upon the porosity (i.e., pore volume and surface area) of the gel immediately after precipitation.

Detailed description of the invention

The azeotropic distillation is conducted by admixing a solvent with the wet gel in an amount in excess of the azeotropic mixture. The admixture is then alternatively refluxed for 0.5 to 2 hours and distilled for a total cycle time of between about 5 to 20 hours and preferably about 8 hours. The temperature of the distillation is dependent upon the particular solvent used and the pressure of the system.

Figure 1:
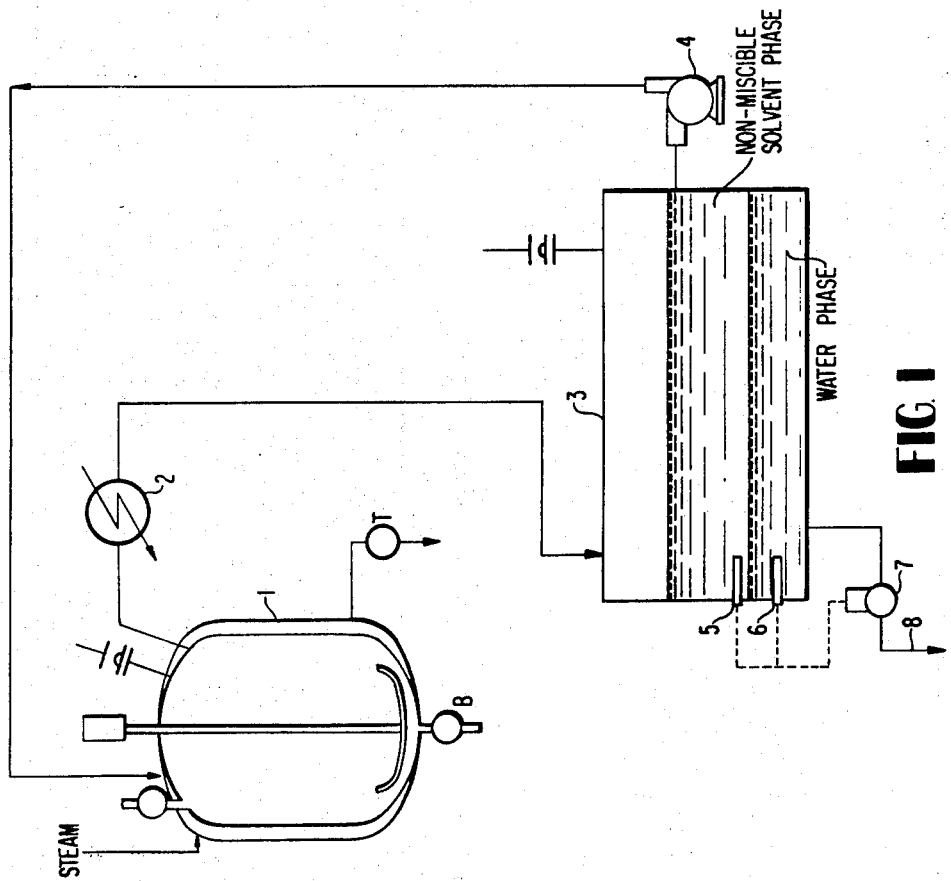
FIG. 1 is a schematic illustration of the azeotropic distillation of the process of the present invention.

A preferred method of carrying out this distillation process is shown in FIG. 1. In this process, the hydrogel is charged into the jacketed vessel 1 through valve A. A solvent which is nonmiscible with water and which forms an azeotrope with water, is retained in storage tank 3 and is pumped into vessel 1. The preferred quantity of solvent is an amount equal to the amount of water contained in vessel 1, although smaller quantities can be used. Vessel 1 is then heated to provide the required distillation.

The distillate is recovered through heat exchanger 2 into storage tank 3 where the azeotrope separates into two phases and water is removed by decantation.

The solvent portion is recirculated into the system by being continuously pumped back into vessel 1 and the system is operated for between about 2 to 20 hours, preferably for about 5 hours, after which pump 4 is stopped and excess solvent is distilled until the silica gel is dried.

Two high and low capacitance probes 5 and 6 are located at the bottom of tank 3 which activate motor valve 7 draining the water from the tank through line 8.

The dry silica gel is discharged through valve B.

Adequate solvents for the present process include: benzene, toluene, xylene, ethyl-acetate, n-propyl formate, n and iso-butyl formate, n and iso-amyl formate, benzyl formate, n-propyl acetate, n and iso-butyl acetate, n and iso-amyl acetate, benzyl acetate, phenyl acetate, ethyl propionate, n-propyl propionate, iso-butyl propionate, iso-amyl propionate, methyl butyrate, n-propyl butyrate, n and iso-butyl butyrate, iso-amyl butyrate, methyl iso-butyrate, ethyl iso-butyrate, di-iso-butyl ether, di-iso-amyl ether, diphenyl ether, phenetole, anisole, resorcinol di- ethyl ether and other solvents which are nonmiscible with water and which form azeotropic mixtures when distilled with water.

The invention will now be described in greater detail with reference to specific examples which illustrate the criticality of process conditions in order to obtain a silica xerogel product having a narrow pore diameter distribution primarily in the range of from 300–600 A., a surface area in the range of from 200–500 m.$^2$/g., a pore volume of from about 2.0 to about 3.5 cm.$^3$/g., and stability at temperatures up to 2,000° F. in a fluidized bed.

Preferred silica xerogels in accordance with the present invention have a pore diameter distribution wherein above about 70% of the cumulative pore volume is within the pore diameter range of 300 to 600 A. and a total pore volume of 2.2 to 3.0 cm.$^3$/g., most preferably 2.5 to 2.9 cm.$^3$/g.

The properties of the silica xerogel obtained in accordance with the invention and particularly the porosity characteristics are discussed in terms of pore volume (PV), surface area (SA), average pore diameter (AV. PD), where $$Av.\ PD = \frac{4\ PV}{SA}$$

and pore size distribution. The determination of the values for the various properties were made by a nitrogen absorption-desorption technique which is well known in the art and which is described in greater detail in the literature. For example, a description of the nitrogen absorption-desorption procedure for evaluating the porisity of silica gel is found in the Journal of the American Chemical Society, volume 60, p. 309 (1938), Journal of Catalysts, volume 2, p. 111 (1955) and elsewhere.

In the following examples, Example I and Example II describe a preferred method for carrying out the process of the invention so as to obtain a silica xerogel of the stated characteristics. The remaining examples illustrate the criticality of various process conditions and describe suitable alternative procedures for obtaining the silica xerogels.

EXAMPLE I 20,160 g. of sodium silicate solution containing 28.7% $SiO_2$ and 8.9% $Na_2O$ was added to 25,440 g. of $H_2O$ and the mixture cooled to 5° C. under agitation.

21,305 g. of $H_2SO_4$ (12.75 wt. percent) was then added as follows:

8,520 g. was added in one hour and the remaining amount in 45 minutes. The final pH of the precipitate was 5.0.

The slurry was then heated to 95° C. within 2 hours and maintained at 95° C. for 2 hours, washed with a solution of 2,225 g. of $NH_4NO_3$ in 45 gallons of water, then with deionized water until the wash liquor titrated or contained less than 20 p.p.m. $Na_2SO_4$ at equilibrium. The slurry was at pH 5.0.

To illustrate all features of the invention, the product slurry was then homogenized for 30 minutes after which a 300 g. sample was drawn, allowed to settle and the excess water decanted. The slurry can also be homogenized prior to washing with $NH_4NO_3$ or can be homogenized after being azeotropically distilled. Homogenization prior to washing (if homogenization is necessary) is most preferred as smaller particles are easier to wash to the required sodium level. Homogenization after azeotropic distillation is non-preferred due to the extra care required with flammable vapors.

60 g. of slurry, containing 11% by weight of solids, was recovered and added to 1,500 g. of ethyl acetate in a distillation flask. The azeotrope was then distilled at atmospheric pressure by using the following procedure: alternatively distilling for ½ hour and refluxing for 1½ hours for a total process time of 8 hours. For precaution, the solvent was continuously added to maintain the same level of liquid in the flask. Temperature fluctuations during the azeotropic distillation were between 70.5° and 71° C. After 8 hours, the gel was dried by distilling the remaining solvent.

In a preferred embodiment, for certain end uses, the following optional step can be performed in the process of this invention:

6. Calcining the product from Step 5 at a temperature between about 500° and about 1,200° F., preferably at about 1,000° F. It should be noted that this final calcination/drying at 500–1,200° F. is generally not considered a catalyst activation (which normally requires higher temperatures) but may in certain instances serve that purpose. However, a specific example of such a calcining/drying is also set out below.

The silica xerogel recovered was calcined in an oven at 1,000° F. for 4 hours before evaluating.

Analysis of the physical properties were: SA=307 m.$^2$/g., PV=2.35 cm.$^3$/g., Pd=317 A.

EXAMPLE II

A 1,000 g. sample obtained in Example I after homogenization was drawn, allowed to settle and the excess water decanted.

A 200 g. sample of the slurry containing 11% by weight solids was then added to a 2,000 ml. distillation flask installed in a laboratory set-up equivalent to the one represented in FIG. 1. 1,000 g. of ethyl acetate was pumped into the distillation flask before starting the distillation, and the distillation was run for 5 hours. The ethyl acetate continuously recovered was pumped back into the distillation flask after the water had been separated by decantation, at a rate equal to the distillation rate of the solvent phase.

After 5 hours, the pump was stopped and the excess solvent distilled off as to obtain a dried silica gel.

The xerogel recovered was calcined in an oven at 1,000° F. for 4 hours and evaluated for its physical properties. SA=323 m.$^2$/g., PV=2.53 cm.$^3$/g., Pd=313 A.

Figure 2:
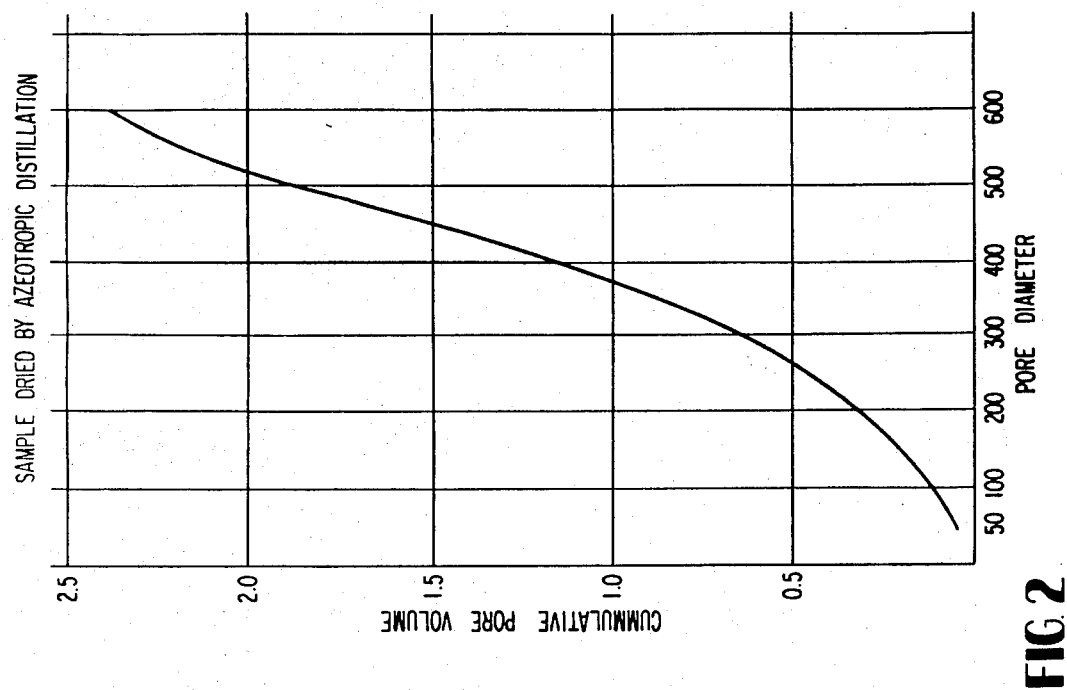
FIG. 2 shows the pore size distribution for the silica xerogel produced by the process of Example II.

FIG. 2 is a distribution curve of the pore sizes. It can be seen that the major portion of the pore volume of the silica xerogel product is accounted for by the gel having a pore size distribution in the narrow range of from 300 A. to 600 A.

Calcination in a fluidized bed for 3 hours at 1,800° F. to activate the xerogel for use as a catalyst base did not alter the physical properties, within analytical error, which were:

SA=320 m.$^2$/g., PV=2.47 cm.$^3$/g., Pd=301 A. Other activation temperatures can be used.

EXAMPLE III

In this example, a 300 g. sample obtained after homogenization in Example I was drawn and the excess water decanted.

A 60 g. sample containing 11% by weight solids was then added to 1,500 g. of ethyl acetate. The azeotrope followed by the excess solvent were distilled off in a continuous manner.

The silica xerogel obtained was calcined in the oven for 4 hours at 1,000 ° F. and evaluated for its physical properties:

SA=342 m.$^2$/g., PV=1.91 cm.$^3$/g., Pd=223 A.

As can be seen when using an azeotrope distillation without using the conditions described in Example I or Example II to dry the product, the pore volume and consequently the average pore diameter were adversely affected.

EXAMPLE IV

To compare the azeotrope distillation technique to the water displacement technique, as disclosed in copending application Ser. No. 750,734, a 30 g. sample was prepared as in Example I and was washed until the filtrate titrated less than 20 p.p.m. Na$_2$SO$_4$. The product was then homogenized, reslurried in acetone and washed with acetone by decantation until the water in the acetone titrated less than 1% at equilibrium.

The acetone was distilled off and the resulting silica gel was calcined in an oven at 1,000° F. for 4 hours.

The physical properties of the silica obtained were found to be substantially the same as those obtained by the water displacement technique, SA=333 m.$^2$/g., PV=2.50 cm.$^3$/g., average Pd=300 A.

EXAMPLE V

All the variables during precipitation, except the concentration of the silica during precipitation, were maintained as in Example I. The final SiO$_2$ concentration was 7% and 10% by weight. FIG. 3 shows the effect of SiO$_2$ concentration on the porosity of the gel just after precipitation.

Referring to FIG. 3 of the drawing, it will be seen that relatively lower pore volumes are obtained where the final silica concentration in the slurry is between 7% and 10% by weight as compared with the pore volume obtained in Example I where an SiO$_2$ concentration of about 8.5% by weight was obtained. FIG. 3 also demonstrates that surface area increases as the concentration of SiO$_2$ increases. Thus, in order to get maximum pore volume and at the same time to obtain a good surface area level, it is preferable to maintain the SiO$_2$ concentration at between about 8% and 9% by weight and most preferably at about 8.5% by weight.

The preferred sodium silicates used can be represented by the formula $x$NA$_2$O.$y$SiO$_2$ where $x/y$ is from 1/1 to about 4/1. Corresponding ranges for other water soluble silicates will be easily calculatable to one skilled in the art.

EXAMPLE VI

All variables during precipitation, except the acid addition rate, was maintained as in Example I. An acid addition rate of 0.5 hour and 2.0 hours for the addition of 40% of the stoichiometric amount of SiO$_2$ was used.

Example VI clearly illustrates, as shown in FIG. 4 of the drawings, that both pore volume and surface area are dependent upon the rate in which the neutralizing medium, in this case, sulfuric acid, is added to the aqueous silicate solution. It will be seen that optimum pore volume and surface area values are obtained using an addition rate of about 1 hour for 40% of the stoichiometric amount and that lower values for pore volume and surface area are obtained where more rapid or slower addition rates are employed, 40% is the system gel point.

EXAMPLE VII

All variables during precipitation, except temperature, were maintained as in Example I. Temperatures of 25° C. and 50° C. were used during precipitation.

As will be seen by reference to FIG. 5, the pore volume decreases as the precipitation temperature increases. Surface area also tends to decrease with an increase in the precipitation temperature, but this value flattens out at about 5° C. This is the preferred temperature of precipitation in order to secure optimum values for pore volume and surface area.

EXAMPLE VIII

All variables during precipitation were maintained the same as in Example I, except CO$_2$ was used to neutralize the sodium silicate instead of sulfuric acid. The physical properties of the silica gel were similar to those obtained under Example I.

EXAMPLE IX

All variables during precipitation were maintained as in Example I. After precipitation, the gel was adjusted to pH 9.0 by adding NaOH (2-normal) and heating for one hour. The gel was then washed with water and acetone as in Example II before evaluating it.

The properties of the silica gel were SA=346 m.²/g., PV=1.96 cm.³/g., Pd=226 A.

As will be seen by comparing the properties of the gel obtained in accordance with Example IX with a product of Example I, too high pH and relatively brief heating during the aging step results in a loss of pore volume. The pore volume obtained in Example I was 2.35 cm.³/g. as compared with only 1.96 cm.³/g. for Example IX.

EXAMPLE X

All variables during precipitation were again maintained as in Example I. After precipitation, the gel was adjusted to pH 5.0 by adding H₂SO₄ (1-normal), and heated to 95° C. for 4 hours to conduct thermally accelerated aging. Samples were taken after different lengths of time, washed with water and then with acetone as in Example IV before evaluating them. Azeotropic distillation yields the same results.

Table I shows the influence of the length of heating time on the porosity of the gel and its pore distribution:

TABLE I

| Time (hrs.) | SA (m.²/g.) | PV (cm.³/g.) | Pd (A) |
|---|---|---|---|
| 0 | 757 | 2.77 | 147 |
| ½ | 492 | 2.72 | 221 |
| 1 | 394 | 2.90 | 294 |
| 1½ | 355 | 2.76 | 311 |
| 2 | 343 | 2.77 | 323 |
| 4 | 284 | 2.56 | 362 |

As will be seen from the data reported in Table I, the thermally accelerated aging of the precipitate should be conducted for a minimum of about 1 hour at pH 5.0 in order to obtain a silica xerogel product having an average pore diameter in the desired range of from about 300 to 600 A.

EXAMPLE XI

All variables during precipitation and heating were again maintained as in Example I. The gel was then washed as in Example I, but only until the filtrate titrated 100 p.p.m. Na₂SO₄. The product was then treated with acetone and evaluated. The physical properties of the gel were substantially the same as in Example I.

When the product was calcined in a fluidized bed at 1,825° F. for 3 hours and evaluated, the properties were:

SA=225 m.²/g., PV=1.62 cm.³/g., Pd=286 A.

As will be seen from the porosity values of the product obtained in accordance with Example XI, the surface area, pore volume and average pore diameter are all adversely affected by the relatively high level of Na₂SO₄ in the product.

While the invention has been particularly shown and described with reference to a preferred embodiment thereof, it will be understood by those skilled in the art that various changes in form and details may be made therein without departing from the spirit and scope of the invention.

What is claimed is:

1. A method for producing a silica xerogel having a narrow pore diameter distribution primarily within the range of from 300 to 600 A., a surface area within the range of from 200 to 500 m.²/g., a pore volume of from about 2.0 to about 3.5 cm.³/g. and stability at temperatures up to about 2,000° F. comprising:
   (a) precipitating a silica hydrogel, under conditions of good agitation, by the neutralization of an aqueous alkaline silicate solution to provide a silica hydrogel slurry having an SiO₂ concentration of from 5 to 12% by weight, the pH during precipitation being maintained between pH 3 and pH 8, the temperature during precipitation being maintained at from about 0° C. to about 17° C. and the neutralizing medium being added to the aqueous alkaline silicate solution at a rate such that the gel point of the solution is reached in from about 30 to about 120 minutes, whereafter the remaining amount of the neutralizing medium required to provide an end pH of between pH 3 and pH 8 is added,
   (b) maintaining the hydrogel slurry from Step (a) at a pH within the range of from 3 to 8 at a temperature and for a time sufficient to strengthen the hydrogel structure,
   (c) reducing the alkaline moiety concentration in the product of Step (b) by washing the product of Step (b) is maintained above the temperature during material, so that the wash liquor, in equilibrium with the product of Step (b), contains less than about 20 p.p.m. of the alkaline material expressed as an acid-base salt thereof,
   (d) adding a solvent which is non-miscible with water and which forms an azeotropic mixture with water, and
   (e) distilling said azeotropic mixture so as to separate the water from said gel and provide said silica xerogel.

2. The method of claim 1 further comprising:
   (f) calcining the product of Step (e).

3. The method of claim 1 wherein the precipitation of silica hydrogel in Step (a) is accomplished by neutralization of the aqueous solution of an alkaline silicate with an agent selected from the group consisting of a strong acid, a weak acid, and an ion-exchange resin.

4. The method of claim 1 wherein the alkaline silicate is an alkali metal silicate and the temperature during Step (b) is maintained above the temperature during Step (a).

5. The method of claim 1 wherein the SiO₂ concentration in the hydrogel slurry of Step (a) is from about 8 to about 9% by weight.

6. The method of claim 1 wherein the temperature during Step (a) is from about 0° C. to about 10° C.

7. The method of claim 1 wherein the pH of the hydrogel slurry during Step (a) is maintained at from about 5 to about 7.

8. The method of claim 1 wherein the pH of the hydrogel slurry in Step (b) is from about 4 to about 7.

9. The method of claim 1 wherein the temperature of the hydrogel slurry during Step (b) is maintained at about 50° C. to about 100° C.

10. The method of claim 1 wherein the time of Step (b) is about 1 to about 6 hours.

11. The method of claim 1 wherein the reduction of concentration of alkaline material is accomplished by washing with a solution of displacing salts selected from the group consisting of ammonium chloride, ammonium nitrate and mixtures thereof.

12. The method of claim 1 wherein Step (c) is accomplished by washing with a solution of a mineral acid selected from the group consisting of HCl, H₂SO₄ and HNO₃.

13. The method of claim 1 wherein up to about 40% of the neutralizing medium is added in from about 30 to about 120 minutes and the remaining neutralizing medium required to provide an end pH of 3 to 8 is added in about 20 to about 90 minutes more.

14. The method of claim 1 wherein the solvent in Step (d) is added in an amount in excess of that required to provide an azetropic mixture.

15. The method of claim 1 wherein said azeotropic mixture is alternately refluxed for about 0.5 to about 2 hours and distilled so that the total process time is between about 5 and about 20 hours.

16. The method of claim 1 wherein the solvent in Step (d) is added in an amount substantially less than that required to provide an azeotropic mixture, the solvent being continuously recycled after decantation of the water from the distilled azeotropic mixture.

17. The method of claim 1 where Step (b) is conducted under agitation.

18. The method of claim 1 wherein the silicate is a sodium silicate of the formula $x\text{Na}_2\text{O} \cdot y\text{SiO}_2$ and $y/x$ is from 1/1 to about 4/1.

19. The method of claim 1 further comprising comminuting the hydrogel after Step (b) but prior to Step (e).

20. A method for producing a silica xerogel having a narrow pore diameter distribution primarily within the range of from 300 to 600 A., a surface area within the range of from 200 to 500 m.²/g., a pore volume of from 2.2 to 3.0 cm.³/g. and stability at temperatures up to about 2000° F. comprising:

(a) precipitating a silica hydrogel by neutralization of an aqueous solution of sodium or potassium silicate to provide a silica hydrogel slurry having an $\text{SiO}_2$ concentration of from 8 to 9% by weight while maintaining the pH at from 5 to 7 and maintaining the temperature at from 0° C. to about 10° C., wherein the neutralizing medium is added to the aqueous sodium or potassium silicate solution at a rate of up to about 40% of the necessary amount in from about 30 to about 120 minutes, and wherein the remaining amount of neutralizing medium necessary to provide an end pH of from about 5 to about 7 is added in a period of time of at least about 20 minutes more, precipitation being under conditions of good agitation, (b) heating the product of Step (a) at a temperature greater than the temperature of Step (a) and at a pH of from 4 to 7 for at least about 1 hour, while agitating the product of Step (a), (c) reducing the sodium or potassium concentration of the product of Step (b) by washing the product of Step (b) with a liquid which displaces said sodium or potassium until the resulting wash liquor, at equilibrium with the product of Step (b), contains less than about 20 p.p.m. sodium or potassium, expressed as an acid-base salt thereof, (d) adding a solvent which is non-miscible with water and which forms an azeotropic mixture with water, and (e) distilling said azeotropic mixture so as to separate the water from said gel and provide said silica xerogel.

21. The method of claim 20 wherein the precipitation of silica hydrogel in Step (a) is accomplished by neutralization of the aqueous solution of sodium or potassium silicate with an agent selected from the group consisting of a strong acid, a weak acid, and an ion-exchange resin and wherein the product of Step (e) is calcined.

22. The method of claim 20 wherein the temperature during Step (b) is maintained in the range of from about 50° C. to about 100° C.

23. The method of claim 20 wherein the reduction of concentration of sodium or potassium is accomplished by washing with a solution of displacing salts selected from the group consisting of ammonium chloride, ammonium nitrate and mixtures thereof.

24. The method of claim 20 wherein Step (c) is accomplished by washing with a solution of a mineral acid selected from the group consisting of HCl, $\text{H}_2\text{SO}_4$ and $\text{HNO}_3$.

25. The method of claim 20 where the remaining at least about 60% of the neutralizing medium required to provide an end pH of 5 to 7 is added in about 20 to about 90 minutes more.

26. The method of claim 20 wherein the solvent in Step (d) is added in an amount in excess of that required to provide an azeotropic mixture.

27. The method of claim 20 wherein said azeotropic mixture is alternately refluxed for 0.5 to 2 hours and distilled so that the total process time is between 5 and 20 hours.

28. The method of claim 20 wherein the solvent in Step (d) is added in an amount substantially less than that required to provide an azeotropic mixture, the solvent being continuously recycled after decantation of the water from the distilled azeotropic mixture.

References Cited

UNITED STATES PATENTS

| | | | |
|---|---|---|---|
| 2,731,326 | 1/1956 | Alexander et al. | 423—338 |
| 2,765,242 | 2/1956 | Alexander et al. | 106—288 X |
| 2,785,051 | 3/1957 | Miller | 423—338 |
| 2,863,727 | 12/1958 | Thornhill et al. | 423—339 |
| 3,041,140 | 6/1962 | Alexander | 423—335 |
| 3,081,154 | 3/1963 | Acker | 423—339 |
| 3,337,299 | 8/1967 | Burke, Jr. | 423—332 |
| 3,428,425 | 2/1969 | Marotta | 423—339 |
| 3,433,593 | 3/1969 | Reinhardt et al. | 423—339 |
| 3,453,077 | 7/1969 | Hyde | 423—338 |

EDWARD STERN, Primary Examiner

U.S. Cl. X.R.

252—451; 423—335, 339